United States Patent [19]

Wagner

[11] 4,381,820
[45] May 3, 1983

[54] FILAMENT REINFORCED PLASTIC SCREEN AND APPARATUS FOR MAKING SAME

[75] Inventor: Walter R. Wagner, Minneapolis, Minn.

[73] Assignee: UOP Inc., Des Plaines, Ill.

[21] Appl. No.: 334,105

[22] Filed: Dec. 24, 1981

[51] Int. Cl.$^3$ .............................................. E21B 43/08
[52] U.S. Cl. .................... 166/231; 242/118.3
[58] Field of Search .............. 166/227, 228, 229, 230, 166/231, 232, 233, 234, 235, 236; 242/118.3, 118.4; 428/17, 93

[56] References Cited

U.S. PATENT DOCUMENTS

| | | | |
|---|---|---|---|
| 956,080 | 4/1910 | Hall | 166/232 |
| 1,723,311 | 8/1929 | Stine | 166/234 |
| 2,341,783 | 2/1944 | Jens | 210/497.1 X |
| 4,299,283 | 11/1981 | Gryskiewicz | 166/234 |

Primary Examiner—Stephen J. Novosad
Assistant Examiner—Joseph Falk
Attorney, Agent, or Firm—James R. Hoatson, Jr.; Barry L. Clark; William H. Page, II

[57] ABSTRACT

Filament reinforced cylindrical plastic screens having open slots defined by their surface wires which are of substantially different widths can be produced on a single helically finned mandrel. The slot widths are varied in accordance with the amount of wire-forming material placed in the generally V-shaped grooves defined by the mandrel fins. The grooves have a double relief angle so that the lower support portions of the surface wires will be formed so as to have a slightly tapered, radially elongated cross-section and the upper portions of the wires will have their sides at a substantially greater relief angle. This relationship permits a relatively small change in the total height of the wires to have a substantial effect on the width of the top portion of the wires, and thus, on the width of the slot openings which can be formed between adjacent wires.

5 Claims, 8 Drawing Figures

4,381,820

FILAMENT REINFORCED PLASTIC SCREEN AND APPARATUS FOR MAKING SAME

BACKGROUND OF THE INVENTION

The invention relates to filament wound, reinforced plastic screens of the general type disclosed in Shobert U.S. Pat. No. 3,658,128 and in my co-pending Wagner et al application Ser. No. 244,382, filed Mar. 16, 1981. The latter application is assigned to the same assignee as the present application and its disclosure is hereby incorporated by reference into the present application. More particularly, the invention relates to the production of filament wound screens on a finned mandrel with the screens being produced so as to have different slot widths to accommodate different expected use conditions. For example, one situation might require a slot width of 0.050", while another might require a slot width of 0.100" or even 0.150". In the aforementioned Shobert U.S. Pat. No. 3,658,128, it is apparent that any width of slot requires a turning down of the finished screen cylinder. Such a machining operation would naturally cut many fibers and destroy the protective resin coating over them, thus making the cut ends porous to water or other liquids which, in the absence of an additional protective coating, could wick along the fibers and deteriorate them. The large side surface relief angles on the triangularly shaped Shobert wires permit a relatively large change in slot width. However, the triangular wire shape shown would result in a large loss of wire material as the screen is turned down in diameter in producing a wide slot. The screen would also exhibit a substantial loss in collapse strength when formed with wide slots since the collapse resistance of the screen varies with the 3rd power of the effective thickness of the wire in the radial direction. The much smaller side surface relief angles disclosed in the aforementioned co-pending application permit the surface screen wires to be wound at a much closer pitch, thus permitting larger percentages of screen "open area" than the Shobert wires since the wires are much narrower and more closely pitched than Shobert's. However, the small relief angle greatly limits the range of slot widths that can be produced on a given mandrel. This is so since the slot width is changed by winding larger or smaller amounts of filaments in the space defined by the helical grooves of the mandrel, thereby changing the radial height of the wire. The narrow relief angle requires a relatively large change in the radial height of the wire to achieve a relatively small change in slot width. Thus, for a given mandrel to be able to produce screens having a predetermined minimum collapse resistance in a given range of slot widths, the narrowest slot screens would have a much larger radial dimension than the widest slot screens and a much greater collapse strength than necessary.

SUMMARY OF THE INVENTION

It is among the objects of the present invention to provide a filament wound screen of a given nominal diameter which can be produced in a wide range of slot width dimensions on a single mandrel. It is a further object to provide such a screen which will require a relatively small change in diameter to produce a substantial change in slot width. It is a still further object to provide such a screen and an apparatus and method of making it so that relatively large amounts of slot open area and a high collapse strength can be achieved with minimal amounts of material being used.

These and other objects are achieved by the apparatus of the present invention in which the side wall surfaces of the tapered fins or projections on the mandrel which form the helical screen surface wires are provided at their radially innermost portions with a small relief angle and at their radially outermost portions with a much larger relief angle. These different relief angles cause the inner portion of the screen wire, which comprises the major portion of the total screen wall thickness, to be relatively narrow in cross-section and to have a small relief angle, such as about 3°, for example. The inner portion provides the basic collapse resistance of the screen. The outer portion of the screen wire has a much larger relief angle, such as about 15°, for example. The large relief angle provides a minimal wall thickness change for a given slot dimension change.

DETAILED DESCRIPTION OF THE INVENTION

Figure 1:
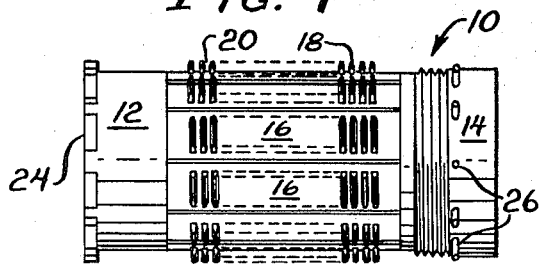
FIG. 1 is a side view showing a mandrel of a type suitable for making the screen of the present invention.
Figure 2:
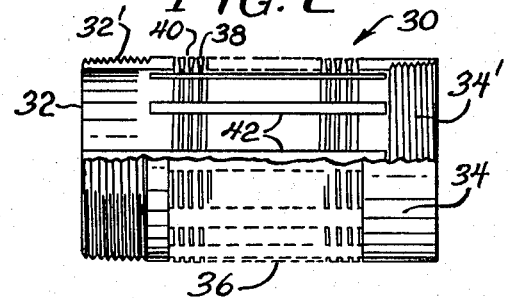
FIG. 2 is a side view, partially sectioned, of a screen incorporating the present invention.

Referring to FIG. 1, a mandrel suitable for use in making the filament wound screen of the present invention is indicated generally at 10. The mandrel 10 is of the type shown in the aforementioned co-pending application in that it has a removable smooth surfaced end portion 12, a removable threaded end portion 14 and a plurality of finned segments 16 containing fin portions 18. The mandrel elements are all mounted on a cylindrical base member (not shown) which is adapted to be removed when the fin segments 16 are collapsed inwardly after a screen is formed thereon. The fin portions 18 on each segment 16 are uniformly spaced from each other and the fin portions on all of the segments, when assembled, lie on the locus of a helix. The spaces 20 between axially adjacent fin portions 18 define the shape of the resin coated filaments (not shown) which are wound therein to form the wire wrap portions of a screen. As explained in the aforementioned application, a single bundle of resin coated filaments can be wound longitudinally between the toothed end projections 24 and the pin projections 26 and circumferentially to produce a screen member 30 which is of the form shown in FIG. 2 except that the male threads 32' on the male end portion 32 are formed by a turning tool. The female end portion 34 of the screen 30 has an internal thread 34' which is integrally formed on the threaded end portion 14 of the mandrel. The intermediate slotted portion 36 of the screen comprises helically wound screen wire portions 38 which define slot openings 40. The wires 38 are supported in spaced relation to each other by support rod portions 42.

Figure 3A:
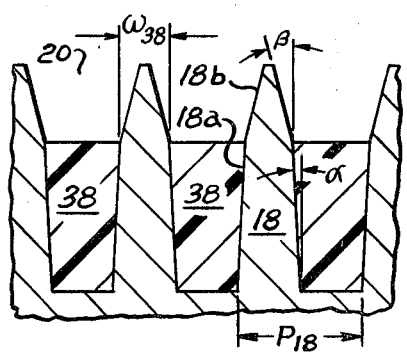
FIGS. 3a and 3b are enlargements of several of the mandrel projections or fins on the mandrel of FIG. 1 showing their relationship to filaments wound thereon to form screen wires having wide and narrow screen slots, respectively.
Figure 3B:
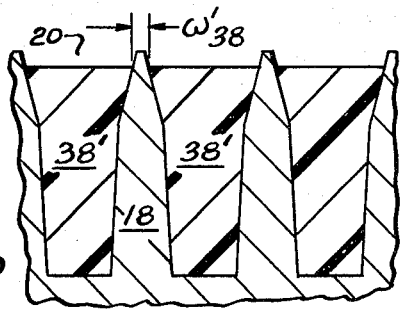
Figure 4A:
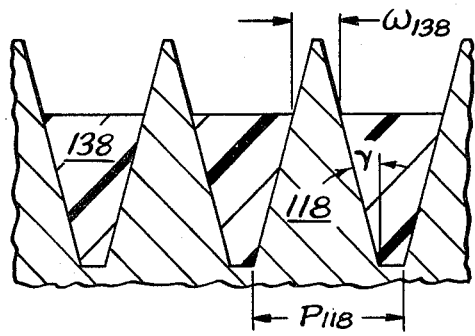
FIGS. 4a and 4b are similar to FIGS. 3a and 3b except they show screen wires having wide and narrow screen slots which have been formed on a mandrel of the type disclosed in the aforementioned copending application.
Figure 4B:
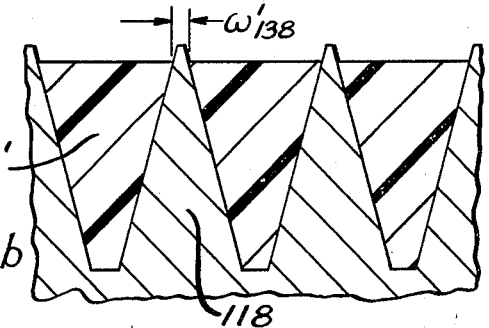

FIGS. 3a and 3b are enlarged cross-sections showing several of the fins 18 of FIG. 1. It can be seen that the fins 18 have their base wall portions 18a positioned at a small relief angle α and their tip wall portions 18b positioned at a much larger relief angle β. As seen in FIG. 3a, the provision for double relief angles permits screen wires 38 to be formed with a wide screen slot space $\omega_{38}$ such as 0.150" and a relatively tall cross-section at a relatively close pitch $P_{18}$ of 0.400", for example, since the relief angle α is preferably quite small, such as 3°. Since the relief angle β is much larger, such as 15°, it can be seen in FIG. 3b that when the screen wires 38′ are made deeper so as to produce a relatively narrow screen slot space $\omega'_{38}$, such as 0.050", the amount of additional depth required is much less than if wall surface 18b was at the same small angle as surface 18a. Referring to FIGS. 4a and 4b wherein the fins 118 have a constant angle γ of about 15°, it can be seen that it is possible for screen wires 138 to be formed with 0.150" slots, $\omega_{138}$ or for wires 138′ to be formed with 0.050" slots, $\omega'_{138}$. However, the pitch $P_{118}$ between fins 118 must be increased from 0.400" to 0.500" to accommodate such a range of slot widths. The prior art design shown in FIGS. 5a and 5b requires that the pitch $P_{218}$ between fins 218 be increased even further, to 0.850", in order to accommodate a range of slot widths $\omega_{238}$, $\omega'_{238}$ from 0.050"–0.150".

If one assumes that the various mandrel fins shown in FIGS. 3a, 3b, 4a, 5a and 5b are sized and pitched so as to produce a screen having a 16.0" outside diameter when the screen slots are 0.150" and so as to permit screen slot openings in a range from 0.050-0.150" and a minimum critical collapse pressure of the resulting screen of 75 psi, it can be readily calculated that the improved dual-relief angle design of FIG. 3b has significant advantages. For example, the wires 38, 38′ have respective cross-sectional areas of 0.0923" and 0.1484", as compared to 0.108" and 0.183" for 138, 138′ or 0.212" and 0.277" for 238, 238′. The smaller cross-section of the FIG. 3a, 3b embodiments requires fewer winding passes and less material to produce. The FIG. 3a, 3b embodiments also have a substantially greater open area of the screen slots $\omega_{38}$, $\omega'_{38}$ per unit of length of screen. Thus, for a given length of screen, much less pumping energy would be required to pass a given volume of liquid through the screen. Alternatively, the same amount of total open slot area could be achieved with less footage of screen. More specifically, for the examples shown in FIGS. 3a, 3b, 4a, 4b, 5a and 5b, respectively, the open area, in percent of total length, can be calculated to be 28.5%, 9.6%, 22.8%, 7.7%, 13.4% and 4.5%. The critical collapse pressure of the aforementioned 6 screen examples can be calculated, respectively, to be 95 psi, 272 psi, 77 psi, 220 psi, 100 psi and 164 psi. Although the FIG. 5a embodiment is slightly better in this regard, the FIG. 3a and 3b embodiments substantially exceed the FIG. 4a, 4b and 5b embodiments in collapse strength. The calculations were made using the aforesaid dimensions and angles and assuming a maximum wire width and wire height for the respective six embodiments 3a–5b of 0.250", 0.500"; 0.350", 0.687"; 350", 0.500"; 0.450", 0.687"; 0.700", 0.606"; and 0.800", 0.693".

Figure 5A:
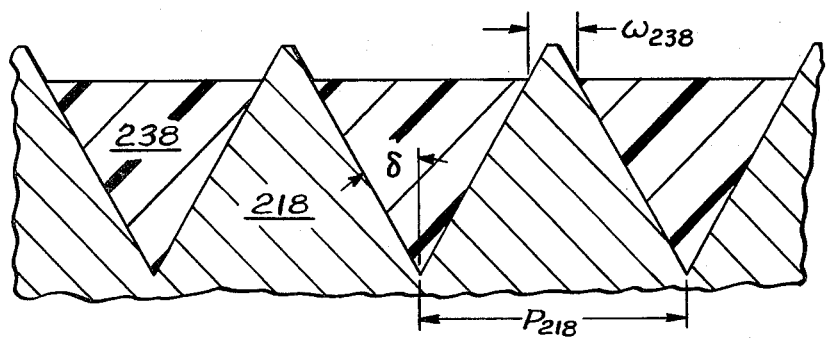
FIGS. 5a and 5b are similar to FIGS. 3a and 3b except they show screen wires having wide and narrow screen slots which have been formed on a mandrel of the type disclosed in the prior art Shobert U.S. Pat. No. 3,658,128.
Figure 5B:
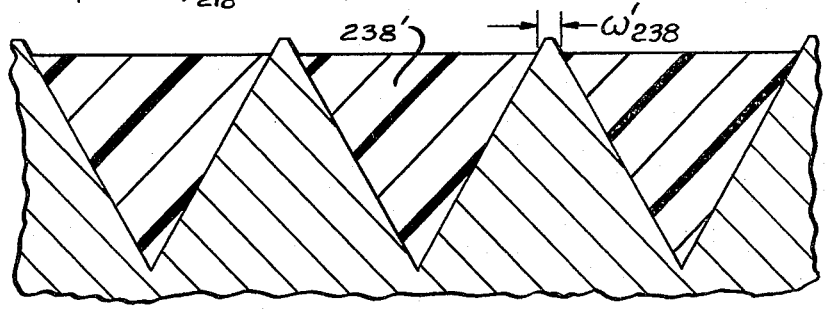

One additional advantage of the invention shown in FIGS. 3a, 3b compared to the FIG. 5a, 5b embodiments is the fact that there is a relatively large difference between the heights of wire 38 and wire 38′ as compared to the difference between 238 and 238′. Thus, a small variation in the amount of material wound between fins 18 in attempting to achieve a given small slot width $\omega'_{38}$ will have much less effect on achieving the desired slot width than would be true in the case of FIG. 5b where very small changes in the height of wire 238′ can produce quite large changes in the slot width $\omega'_{238}$.

It is preferred that the angle α at which the major portion 18a of the length of the side of fin 18 is formed be no greater than about 5° and preferably no greater than about 3°. Some angle is necessary to facilitate withdrawal of the mandrel segments radially inwardly of the screen after the screen is wound and cured. However, too large an angle α is wasteful of material since the ability of the screen wires 38, 38′ to resist collapse depends to a much greater extent on the height of the wire than on its width. It is also preferred that the angle β at which the minor portion 18b of the length of the side of fin 18 is formed be at least 10° and preferably about 15°. Since the side wall portions of the wear surface portion of the wires 38, 38′ is formed by the wall portions 18b, it can be seen that having a smaller angle β would make it necessary to make the wire 38′ much taller in order to enable a single mandrel to make the variation in slot sizes $\omega_{38}$, $\omega'_{38}$, shown in FIGS. 3a, 3b. The extra height would add unneeded collapse strength for small slot opening screens at the expense of requiring much additional material. However, angle β should not be too large either since it would then be difficult to obtain a desired uniform slot width $\omega'_{38}$ since it is not possible to exactly fill every groove between adjacent fins 18 with the identical volume and density of resin coated filamentary wrapping material.

I claim as my invention:

1. In a well screen formed entirely of filament reinforced plastic and having an elongated helically wound slotted screen portion and integral non-slotted end portions, the improvement wherein the cross-section of the screen wires which define the slotted screen portion is of generally trapezoidal shape having its maximum dimension in a radial direction, the surface and base sides of said cross-section being generally parallel to each other and the generally radial sides being tapered in an inwardly converging direction, said last named sides being tapered at a relatively small diverging angle along the major portion of their length starting from their base side and being tapered at a relatively larger diverging angle along the remaining minor portion of their length to the surface side.

2. A well screen according to claim 1 wherein the taper angle of said major portion is no greater than about 5°.

3. A well screen according to claim 1 wherein the taper angle of said major portion is no greater than about 3°.

4. A well screen according to claim 3 wherein the taper angle of said minor portion is at least 10°.

5. A well screen according to claim 3 wherein the taper angle of said minor portion is about 15°.

* * * * *